(12) United States Patent
Manz

(10) Patent No.: US 10,916,987 B2
(45) Date of Patent: Feb. 9, 2021

(54) STATOR, ASSOCIATED ELECTRIC MOTOR AND ASSOCIATED METHOD

(71) Applicant: Regal Beloit America, Inc., Beloit, WI (US)

(72) Inventor: Alan Jacob Manz, Paulding, OH (US)

(73) Assignee: REGAL BELOIT AMERICA, INC., Beloit, WI (US)

( * ) Notice: Subject to any disclaimer, the term of this patent is extended or adjusted under 35 U.S.C. 154(b) by 214 days.

(21) Appl. No.: 16/173,211

(22) Filed: Oct. 29, 2018

(65) Prior Publication Data

US 2020/0136453 A1 Apr. 30, 2020

(51) Int. Cl.
| | |
|---|---|
| H02K 3/30 | (2006.01) |
| H02K 3/28 | (2006.01) |
| H02K 1/12 | (2006.01) |
| H02K 1/22 | (2006.01) |
| H02K 3/32 | (2006.01) |

(52) U.S. Cl.
CPC ............... *H02K 3/28* (2013.01); *H02K 1/12* (2013.01); *H02K 1/22* (2013.01); *H02K 3/325* (2013.01)

(58) Field of Classification Search
CPC ............................................. H02K 3/30–3/40
See application file for complete search history.

(56) References Cited

U.S. PATENT DOCUMENTS

| | | | |
|---|---|---|---|
| 4,340,829 A * | 7/1982 | McCoy | H02K 3/522 |
| | | | 310/194 |
| 4,419,554 A | 12/1983 | Osika | |
| 8,283,832 B2 | 10/2012 | Petro et al. | |
| 8,853,913 B2 * | 10/2014 | Tang | H02K 3/345 |
| | | | 310/215 |
| 9,093,874 B2 | 7/2015 | Petro et al. | |
| 9,172,289 B2 | 10/2015 | Kreidler et al. | |
| 9,698,645 B2 * | 7/2017 | Kreidler | H02K 5/225 |
| 9,941,764 B2 * | 4/2018 | Huber | H02K 3/38 |
| 10,193,422 B2 * | 1/2019 | Kouda | B25B 21/00 |
| 10,298,098 B2 * | 5/2019 | Niwa | H02K 11/0094 |
| 10,348,158 B2 * | 7/2019 | Niwa | H02K 11/215 |
| 2008/0116761 A1 * | 5/2008 | Lin | H02K 3/522 |
| | | | 310/257 |
| 2009/0324435 A1 * | 12/2009 | Sears | H02K 3/522 |
| | | | 417/423.7 |

(Continued)

FOREIGN PATENT DOCUMENTS

| | | |
|---|---|---|
| CN | 201490821 U | 5/2010 |
| CN | 202111598 U | 1/2012 |

(Continued)

*Primary Examiner* — Ramon M Barrera
(74) *Attorney, Agent, or Firm* — Armstrong Teasdale LLP

(57) ABSTRACT

An electric motor with a stator includes a first plurality of coils and a plurality of first electrical connectors. Each of the coils of the first plurality of coils are connected to at least one of the plurality of first electrical connectors. The stator also includes a first guide on a first end of the motor for guiding each of the first electrical connectors. The stator also includes a second plurality of coils. Each of the coils of the second plurality coils is connected to at least one of a plurality of second electrical connectors. The stator also includes a second guide on a opposed second end of the motor positioned at least partially over the second end face of the stator. The second guide guides each of the second electrical connectors.

20 Claims, 9 Drawing Sheets

(56) References Cited

U.S. PATENT DOCUMENTS

| | | | | |
|---|---|---|---|---|
| 2017/0317548 A1* | 11/2017 | Suzuki | ................... | B23D 47/12 |
| 2018/0034354 A1* | 2/2018 | Niwa | ..................... | H02K 3/522 |
| 2019/0001452 A1* | 1/2019 | Nagahama | ......... | H02K 15/0068 |
| 2019/0006909 A1* | 1/2019 | Nagahama | ............. | H02K 11/21 |

FOREIGN PATENT DOCUMENTS

| | | | |
|---|---|---|---|
| CN | 203326835 U2 | 12/2013 | |
| CN | 204992975 U | 1/2016 | |
| CN | 205829370 U | 12/2016 | |
| CN | 103427511 B | 3/2018 | |
| JP | 05882736 B2 | 3/2016 | |

* cited by examiner

STATOR, ASSOCIATED ELECTRIC MOTOR AND ASSOCIATED METHOD

BACKGROUND

The field of the disclosure relates generally to electric motors, and more specifically, three phase electric motors with interpole connections.

Three phase electric motors, including EC motors have winding systems that are wound with multiple coils on the stator core that must be connected together, hereafter referred to as interpole connections. These motors are often wound in such a way that results in the interpole connections of each phase to be in contact with each other. This can lead to winding failures if the phases short together. For ease of manufacturing, these interpole connections are typically routed around the outside edge of the stator core and on the same end of the stator. The wires can be routed using features of an insulating stator endcap. This leads to the interpole connections crossing over each other in multiple locations, creating a risk of phase-to-phase shorts due to the voltage potential difference between the phases.

Much effort has been taken over the years to improve insulation properties of the windings. There are many different methods used to keep the interpole connections electrically isolated from each other, but most require complex parts, extra labor, or specialized manufacturing equipment. The invention presented here involves winding the three phase motors by moving one of the three phase interpole connections to the opposite side of the stator core as the other two phases. By electrically isolating one of the phases, it reduces the number of opportunities for phase-to-phase shorts by at least ⅓. As an example, the winding pattern presented below reduces the number of phase-to-phase contact points from 9 to 3. Another benefit of this invention is that it allows use of larger diameter wire without having to increase the thickness or height of the insulating end cap design.

BRIEF DESCRIPTION

According to an aspect of the present invention, an electric machine is provided. The machine includes a housing that defines a cavity in the housing. The housing has an external periphery. The machine also includes a rotor and a stator.

The rotor defines an axis of rotation of the rotor. The rotor is disposed at least partially within the housing and configured to rotate relative to the housing about the axis of rotation The stator is positioned at least partially within the housing. The stator includes a body connected to the housing. The body defines a plurality of spaced apart inwardly extending protrusions. The protrusions extend axially in a direction parallel to the axis of rotation of the rotor from a first end face of the stator to an opposed second end face of the stator. The stator also includes a first plurality of coils. Each of the coils of the first plurality coils is wrapped around one of the protrusions.

The stator also includes a plurality of first electrical connectors. Each of the coils of the first plurality of coils are connected to at least one of the plurality of first electrical connectors. The stator also includes a first guide positioned at least partially over the first end face of the stator. The first guide guides each of the first electrical connectors.

The stator also includes a second plurality of coils. Each of the coils of the second plurality coils are wrapped around one of the protrusions. The stator also includes a plurality of second electrical connectors. Each of the coils of the second plurality coils is connected to at least one of the plurality of second electrical connectors. The stator also includes a second guide positioned at least partially over the second end face of the stator. The second guide guiding each of the second electrical connectors.

In another aspect, the machine may be configured wherein the first guide defines a feature for receiving a portion of at least one of the plurality of first electrical connectors.

In another aspect, the machine may be configured wherein the first guide is made of a polymer.

In another aspect, the machine may be configured wherein the electric machine includes a three phase electrically commutated motor.

In another aspect, the machine may be configured wherein the first plurality of coils is utilized for a first of the three phases of the motor.

In another aspect, the machine may be configured wherein the second plurality of coils is utilized for one of a second and a third of the three phases of the motor.

In another aspect, the machine may be configured wherein the plurality of first electrical connectors include connector wires.

In another aspect, the machine may be configured wherein the first plurality of coils includes coil wires.

In another aspect, the machine may be configured wherein at least one of the coil wires and at least one of the connector wires are fabricated of a continuous wire.

In another aspect, the machine may be configured wherein the protrusions include teeth.

In another aspect, the machine may be configured wherein at least one of the first guide and the second guide includes tooth portions of the guides, each tooth portion positioned adjacent one of the teeth.

In another aspect, the machine may be configured wherein at least one of the first plurality of coils and second first plurality of coils is wrapped around one of the tooth portions.

In another aspect, the machine may be configured wherein the first guide includes axially extending tabs for guiding the plurality of first electrical connectors.

In another aspect, the machine may be configured wherein the first guide defines a circumferential recess for guiding the plurality of first electrical connectors.

According to another aspect of the present invention, a stator is provided. The stator is for use in an electric machine having a housing and a rotor. The rotor defines an axis of rotation of the rotor. The stator is positioned at least partially within the housing.

The stator includes a body connected to the housing, the body defining a plurality of spaced apart inwardly extending protrusions. The protrusions extend axially in a direction parallel to the axis of rotation of the rotor from a first end face of the stator to an opposed second end face of the stator. The stator also includes a first plurality of coils. Each of the coils of the first plurality coils are wrapped around one of the protrusions. The stator also includes a plurality of first electrical connectors. Each of the coils of the first plurality coils are connected to at least one of the plurality of first electrical connectors.

The stator also includes a first guide positioned at least partially over the first end face of the stator. The first guide guides each of the first electrical connectors.

The stator also includes a second plurality of coils. Each of the coils of the second plurality coils wrapped around one of the protrusions.

The stator also includes a plurality of second electrical connectors. Each of the coils of the second plurality of coils is connected to at least one of the plurality of second electrical connectors.

The stator also includes a second guide positioned at least partially over the second end face of the stator. The second guide guides each of the second electrical connectors.

In another aspect, the stator may be configured wherein the first guide defines a feature for receiving a portion of at least one of the plurality of first electrical connectors.

In another aspect, the stator may be configured wherein the first guide includes a polymer.

In another aspect, the stator may be configured wherein the electric machine includes a three phase electrically commutated motor.

In another aspect, the stator may be configured wherein the first plurality of coils is utilized for a first of the three phases of the motor.

In another aspect, the stator may be configured wherein the second plurality of coils is utilized for one of a second and a third of the three phases of the motor.

In another aspect, the stator may be configured wherein the plurality of first electrical connectors include connector wires.

In another aspect, the stator may be configured wherein the first plurality of coils include coil wires.

In another aspect, the stator may be configured wherein at least one of the coil wires and at least one of the connector wires are fabricated of a continuous wire.

In another aspect, the stator may be configured wherein the protrusions include teeth.

In another aspect, the stator may be configured wherein at least one of the first guide and the second guide includes tooth portions. Each tooth portion may be positioned adjacent one of the teeth.

In another aspect, the stator may be configured wherein at least one of the first plurality of coils and second first plurality of coils is wrapped around one of the tooth portions.

In another aspect, the stator may be configured wherein the first guide includes axially extending tabs for guiding the plurality of first electrical connectors.

In another aspect, the stator may be configured wherein the first guide defines a circumferential recess for guiding the plurality of first electrical connectors.

According to another aspect of the present invention, a method for making an electrical machine is provided. The method includes the step of providing a housing defining a cavity therein and having an external periphery of the housing. The method also includes the step of providing a rotor defining an axis of rotation of the rotor and the step of disposing the rotor at least partially within the housing. The method also includes the step of configuring the rotor to rotate relative to the housing about the axis of rotation and the step of providing a stator with a first end face and an opposed second end face.

The method also includes the step of positioning the stator at least partially within the housing. The stator includes a body. The method also includes the step of connecting the body to the housing and the step of providing the body with a plurality of spaced apart inwardly extending protrusions. The method also includes the step of extending the protrusions in a direction parallel to the axis of rotation of the rotor from the first end face of the stator to the opposed second end face of the stator and the step of positioning a first guide at least partially over the first end face of the stator.

The method also includes the step of positioning a second guide at least partially over the second end face of the stator and the step of wrapping wire around one of the protrusions to form a first coil. The method also includes the step of wrapping wire around another one of the protrusions to form a second coil and the step of connecting the first coil to a first electrical connector. The method also includes the step of connecting the second coil to a second electrical connector and the step of wrapping wire around another one of the protrusions to form a third coil.

The method also includes the steps of wrapping wire around another one of the protrusions to form a fourth coil, connecting the third coil to a third electrical connector, connecting the fourth coil to a fourth electrical connector, and guiding the third electrical connector and the fourth electrical connector along the second guide.

In another aspect, the method may be provided wherein the electric machine includes a three phase electrically commutated motor. The method may further include the step of utilizing the first plurality of coils for a first of the three phases of the motor and further include the step of utilizing the second plurality of coils for one of a second and a third of the three phases of the motor.

DETAILED DESCRIPTION

Figure 1:
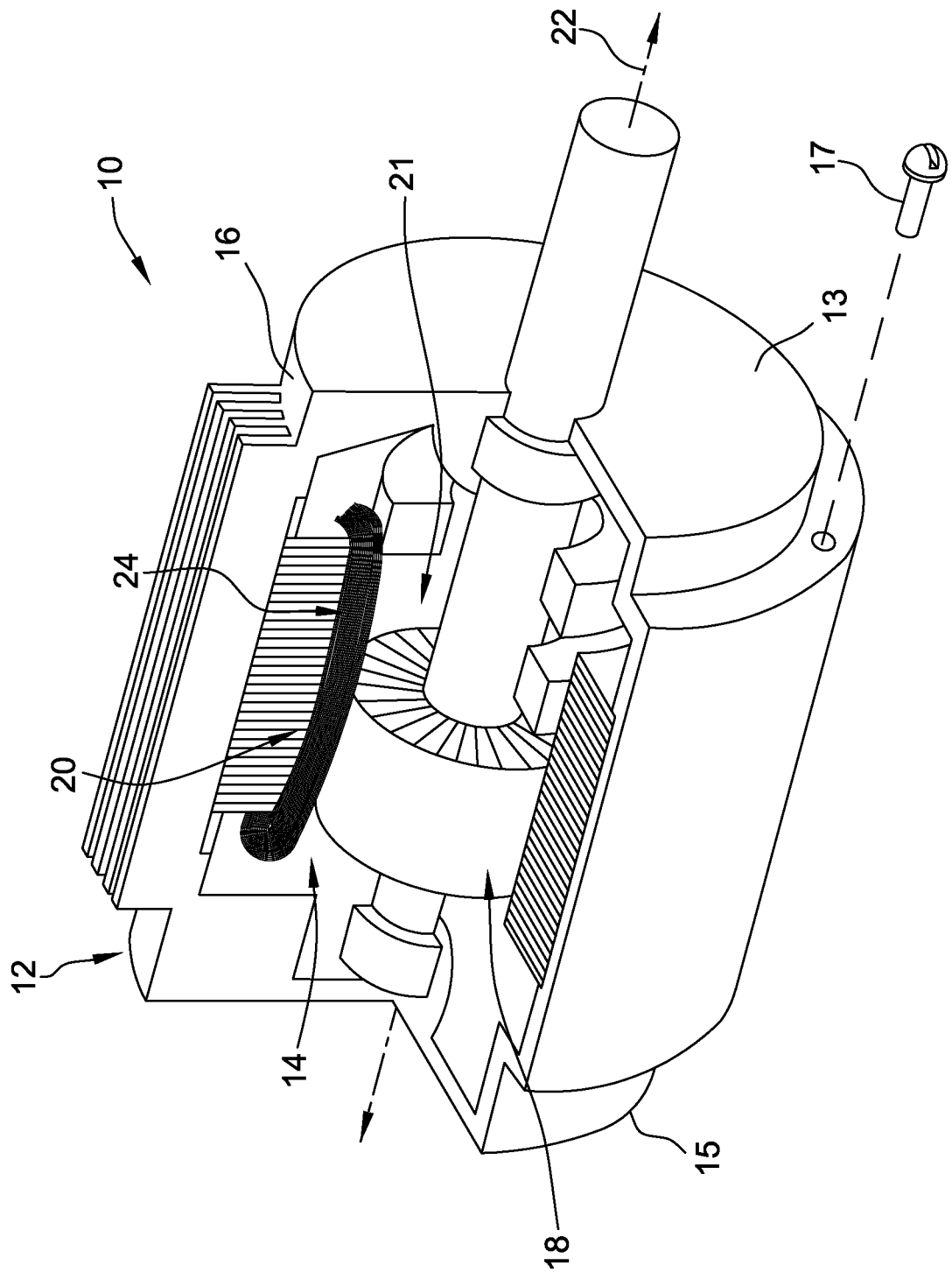
FIG. 1 is a perspective view of a three-phase motor according to an aspect of the present invention.

Referring to FIG. 1 and according to an aspect of the present invention, an electric machine 10 is provided. As shown, the machine 10 is a motor. It should be appreciated that the machine 10 may also be a generator. The machine 10 includes a housing 12 that defines a cavity 14 in the housing 12. The housing 12 has an external periphery 16. The machine 10 also includes a rotor 18 and a stator 20.

The rotor 18 defines an axis of rotation 22 of the rotor 18. The rotor 18 is disposed at least partially within the housing 12 and configured to rotate relative to the housing 12 about the axis of rotation 22.

The stator 20 is positioned at least partially within the housing 12. The stator 20 includes a body 24 having a central opening 21 for receiving the rotor 18 and the stator 20 is connected to the housing 12. The body 24 may have any suitable shape and be made of any suitable materials. For example, to obtain proper electromagnetic properties, the body 24 may be made of a series of planar sheets of, for example, metal. The sheets may be joined together mechanically or by an adhesive.

Referring now to FIGS. 2-6, the stator 20 is shown in greater detail. The body 24 of the stator 20 defines a plurality of spaced apart inwardly extending protrusions or teeth 26. The protrusions 26 extend axially in a direction parallel to the axis of rotation of the rotor 18 from a first end face 28 of the stator 20 to an opposed second end face 30 of the stator body 24. The stator 20 also includes a first plurality 31 of coils 32 formed from wire 33, typically a continuous wire. Each of the coils 32 of the first plurality of coils is wrapped around one of the protrusions 26.

Figure 4:
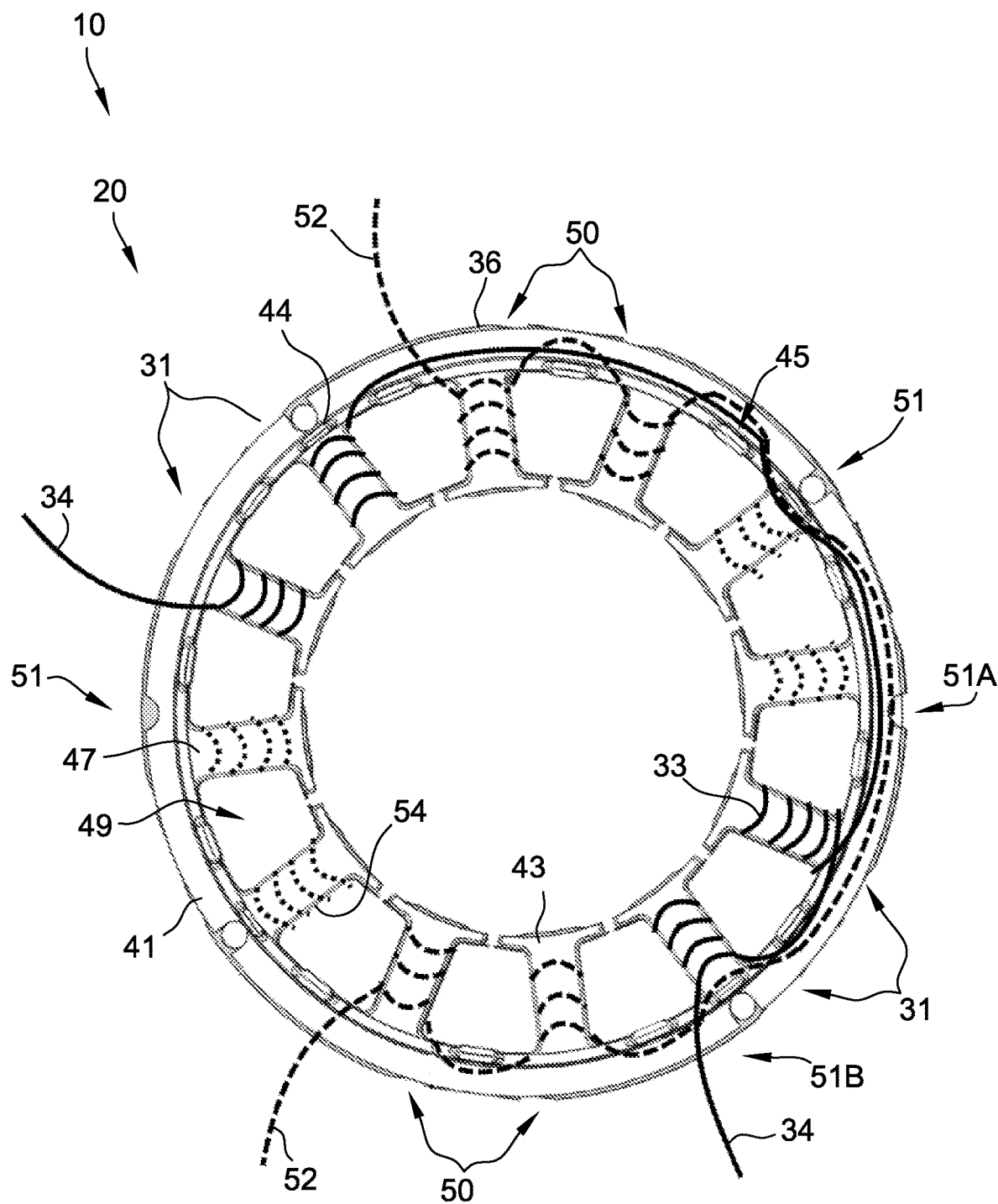
FIG. 4 is a plan view of the stator of FIG. 2 showing the interpole connections for the first and second phases on the first end face of the stator.

As shown in FIG. 4, the stator 20 also includes a plurality of first electrical connectors 34. As shown, the first plurality 31 of coils 32 are shown in solid lines. Each of the coils 32 of the first plurality 31 of coils are connected to at least one of the plurality of first electrical connectors 34. The stator 20 also includes a first guide 36 positioned at least partially over the first end face 28 of the stator 20, the first guide 36 guiding each of the first electrical connectors 34.

For a three-phase motor, as shown in FIGS. 2-6, one third of the coils are wired to be energized by each of the three phases: phase A, phase B and phase C. For example, for a 15-coil motor, 5 coils are energized by each phase. As shown, for a 12-coil motor, 4 coils are energized by each phase. The first plurality 31 of coils 32 may represent phase A or the blue coil leads.

Figure 5:
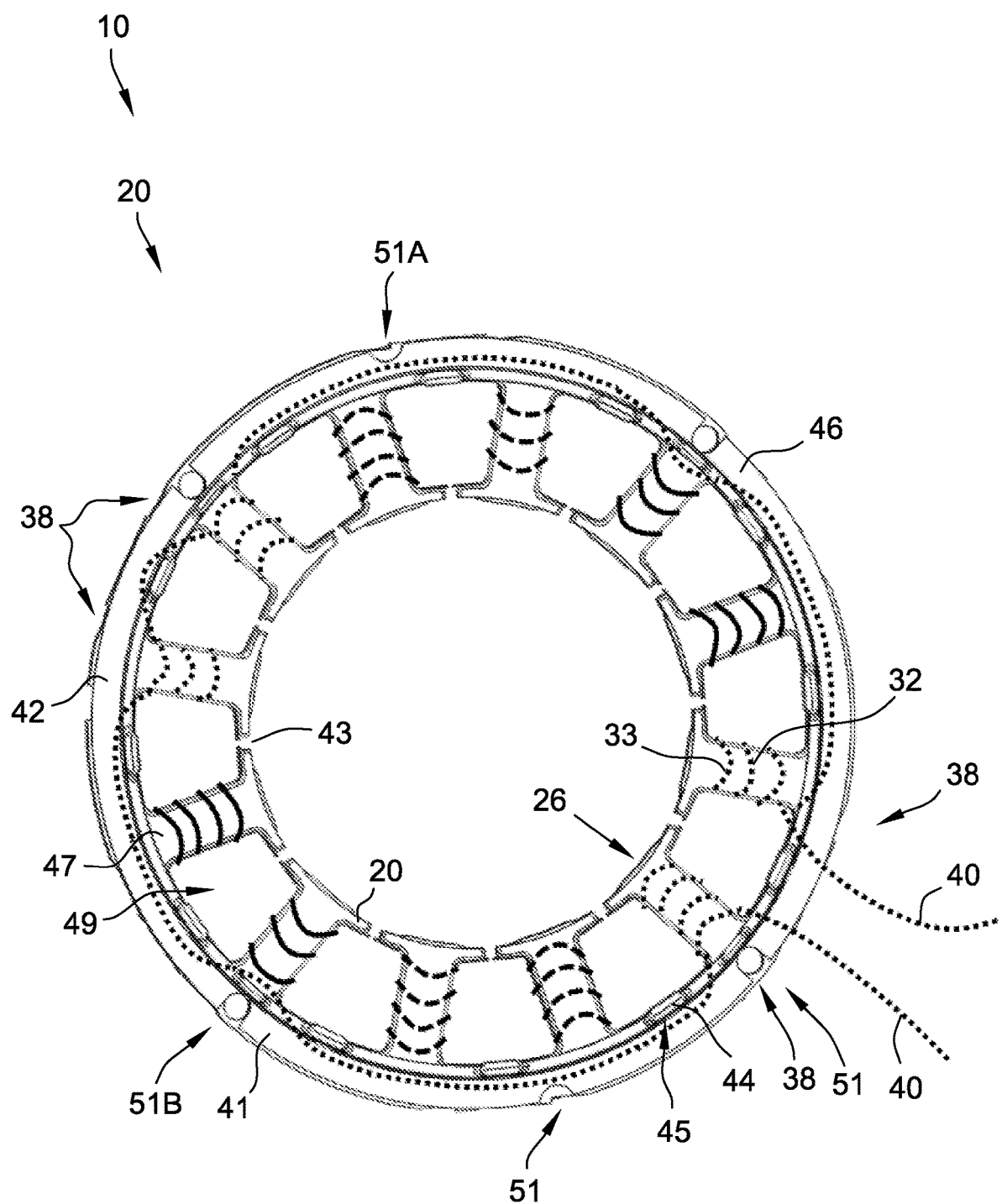
FIG. 5 is a plan view of the stator of FIG. 2 showing the interpole connections for the third phase on the second end face of the stator.

Referring now to FIG. 5, the stator 20 also includes a second plurality 38 of coils, each of the coils 32 of the second plurality 38 of coils is wrapped around one of the teeth 26. The stator 20 also includes a plurality of second electrical connectors 40.

As shown, the first plurality 38 of coils 32 are shown in dotted lines. Each of the coils 32 of the second plurality 38 of coils is connected to at least one of the plurality of second electrical connectors 40. The stator 20 also includes a second guide 42 positioned at least partially over the second end face 30 of the stator 20. The second guide 42 guides each of the second electrical connectors 40. For a three-phase motor, as shown in FIGS. 2-6, the second plurality 38 of coils 32 may represent phase C.

It should be appreciated that the guides 36 and 42 may guide the electrical connectors 34 and 40 in any suitable way, may have any suitable shape, and may be made of any suitable material or materials. For example, the guides 36 and 42 may be in the form of a cover or end plate that fits over the end faces 28 and 30 of the stator 20. For example, the guides 36 and 42 may define a first feature 44 for receiving a portion 45 of at least one of the plurality of first electrical connectors 34 and 40.

Figure 2:
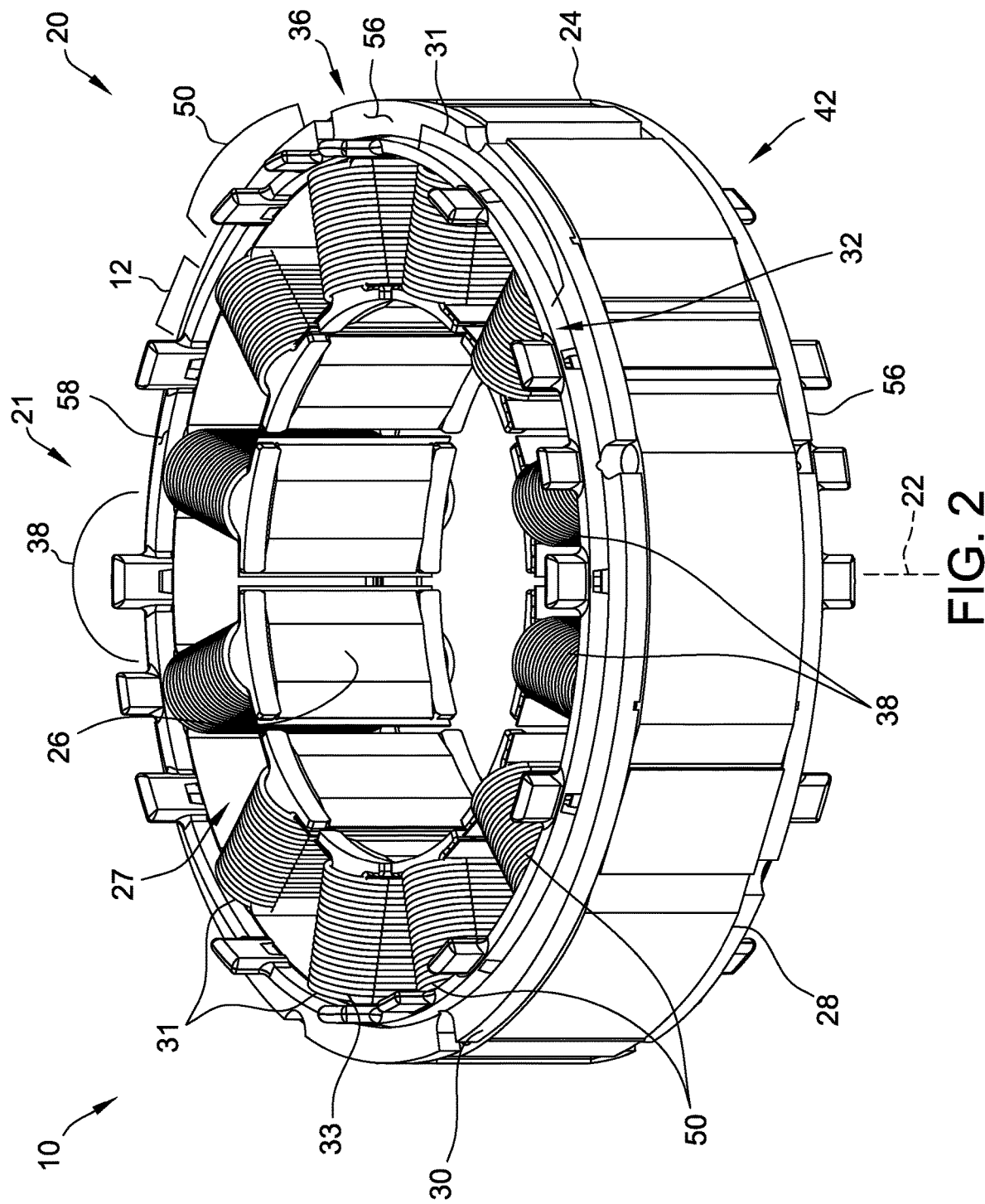
FIG. 2 is a perspective view of a stator for use in the motor of FIG. 1, showing the coils, but with the interpole connections removed.

The first feature 44 may, as shown in FIG. 2, be in the form of a tab or finger extending radially outwardly from body 46 of guides 36 and 42. The tab 44 may, as shown in FIG. 2, be in the form of a protrusion, tab or finger and may have a uniform cross section, for example, a rectangular cross section. The tab 44 may, as shown be integral with the body 46 of the guides 36 and 42.

It should be appreciated that the guides 36 and 42 may be made of a suitable durable material, for example a polymer, a metal or a composite. As shown the guides 36 and 42 may be made of a polymer and may be molded.

The guides 36 and 42 may, as shown, for simplicity and to minimize costs, be identical to each other. The guides 36 and 42 may be mirror images of each other and may be different in shape, size, construction or materials.

As shown in FIGS. 2-6, the body 46 of the guides 36 and 42 may have a generally planar disk shape that defines an outer cylindrical ring 41, an inner cylindrical ring 43 and a plurality of spokes 47 extending from the outer ring 41 to the inner ring 43. The spokes 47 and the rings 41 and 43 define openings 49 bounded by the spokes 47 and the rings 41 and 43. The openings 49 provide passageways for the wire 33 that forms the coils 32. For simplicity, the openings 49 and the teeth 26 have a one to one correspondence and the openings 49 are aligned with the spaces 27 between teeth 26 where the coils 32 are formed.

The guides 36 and 42 may also include peripheral voids 51. For example, the voids may be in the form of rectangular voids 51B with a semicircular end for passage of housing longitudinal fasteners or bolts 17 used to connect first end cap 13 to the second end cap 15 and to secure the stator body or laminations 24 to the housing 12 (see FIG. 1).

As shown in FIGS. 4 and 5, the voids 51 extend axially through the guides 36 and 42. For example, the voids 51 may likewise be in the form of semicircular voids 51A that may provide a passageway for wires between the stator 20 and the housing 12.

As shown in FIGS. 3-6, the guides 36 and 42 may also include the tabs 44 to provide support and guidance for the connectors 31 that extend from the coils 32 to power supply or power source 48. One tab 44 may be aligned with each opening 49 and extend axially from the outer cylindrical ring 41. Additional tabs 44 may be positioned in alignment with the rectangular voids 51B.

Figure 6:
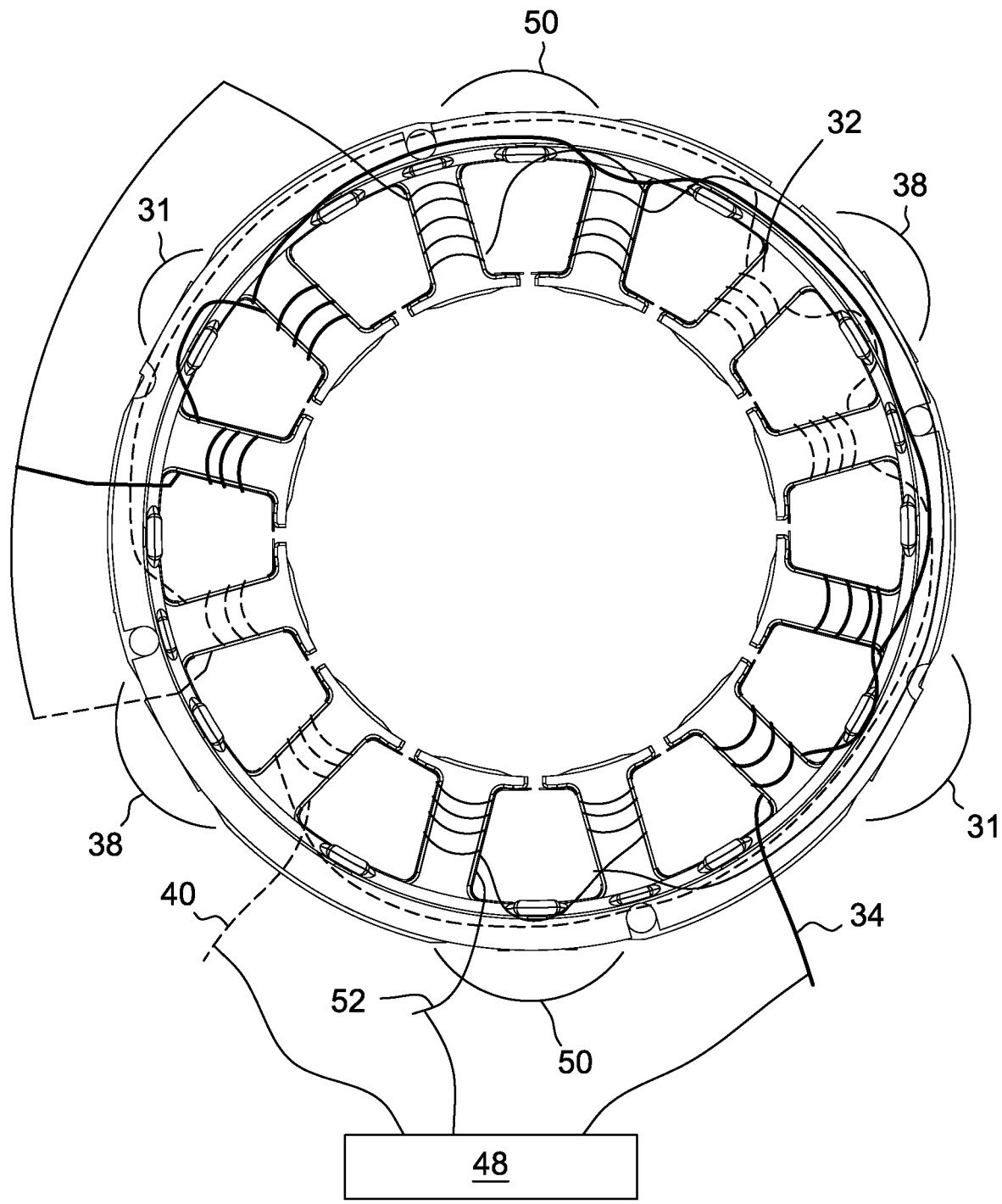
FIG. 6 is a plan view of the stator of FIG. 2 showing the power connections.
Figure 7A:
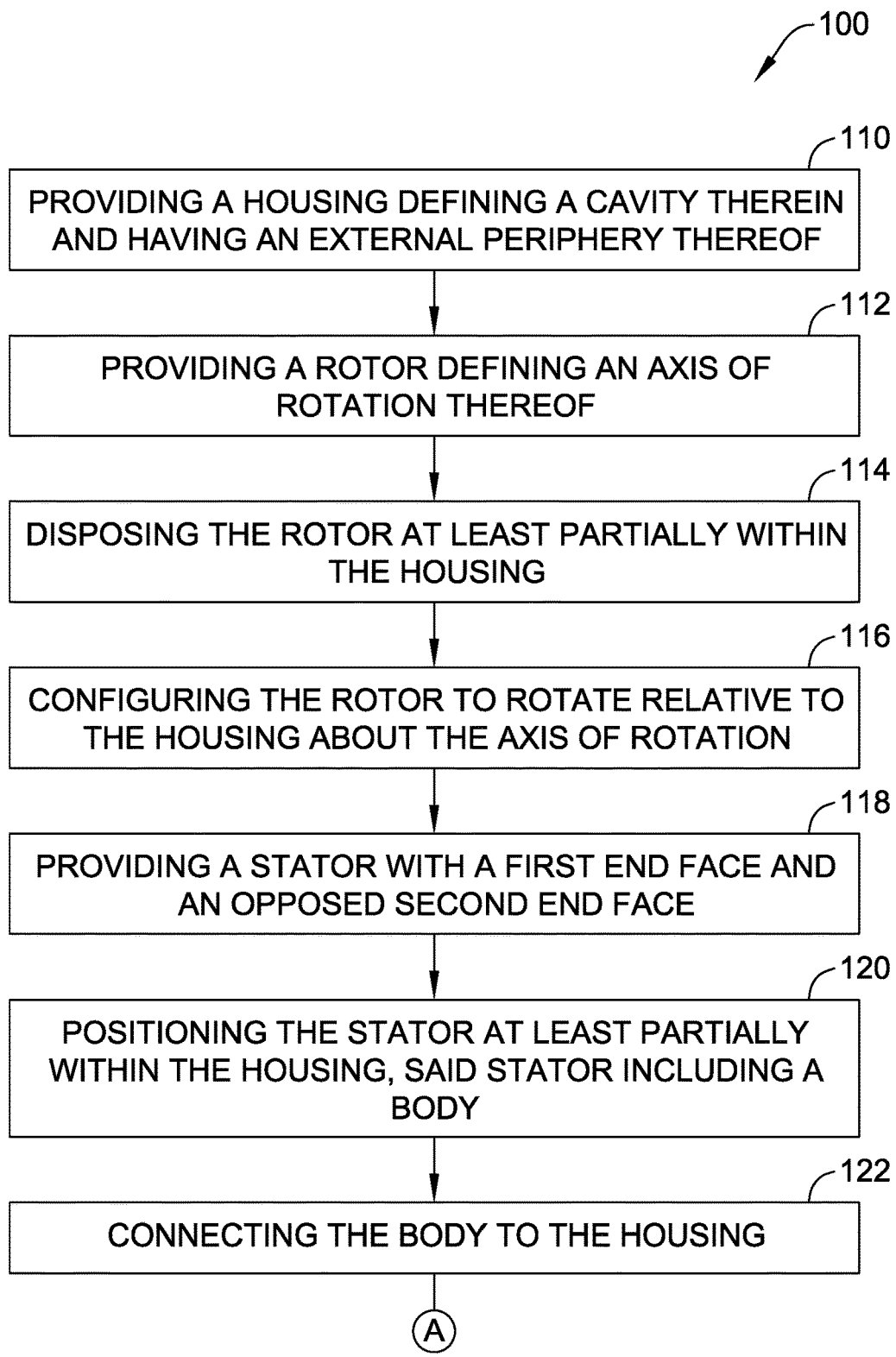
FIG. 7A is a first portion of a flow diagram of an exemplary method for providing interpole connections for a stator according to an aspect of the present invention.
Figure 7B:
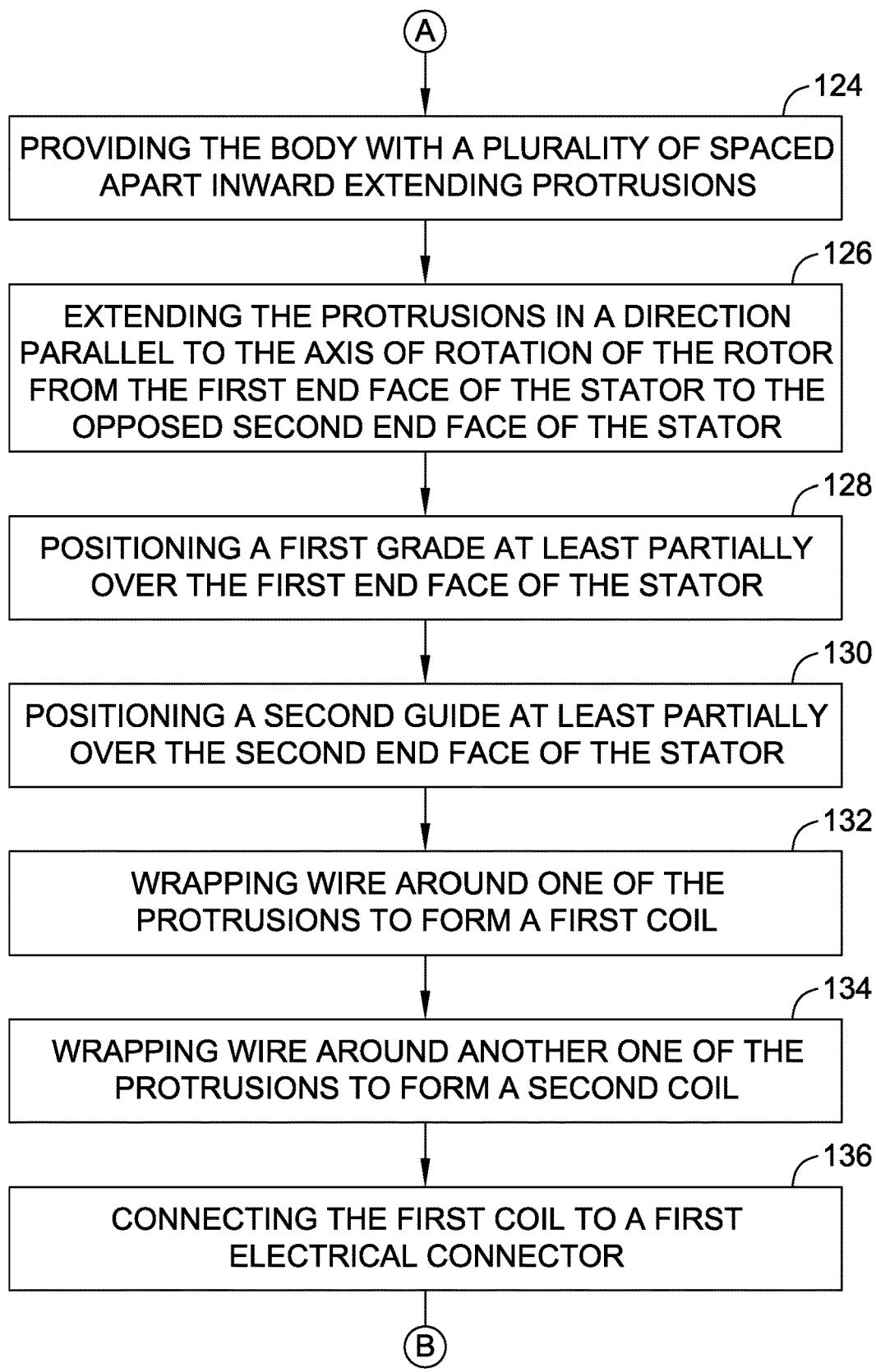
FIG. 7B is a second portion of a flow diagram of an exemplary method for providing interpole connections for a stator according to an aspect of the present invention.
Figure 7C:
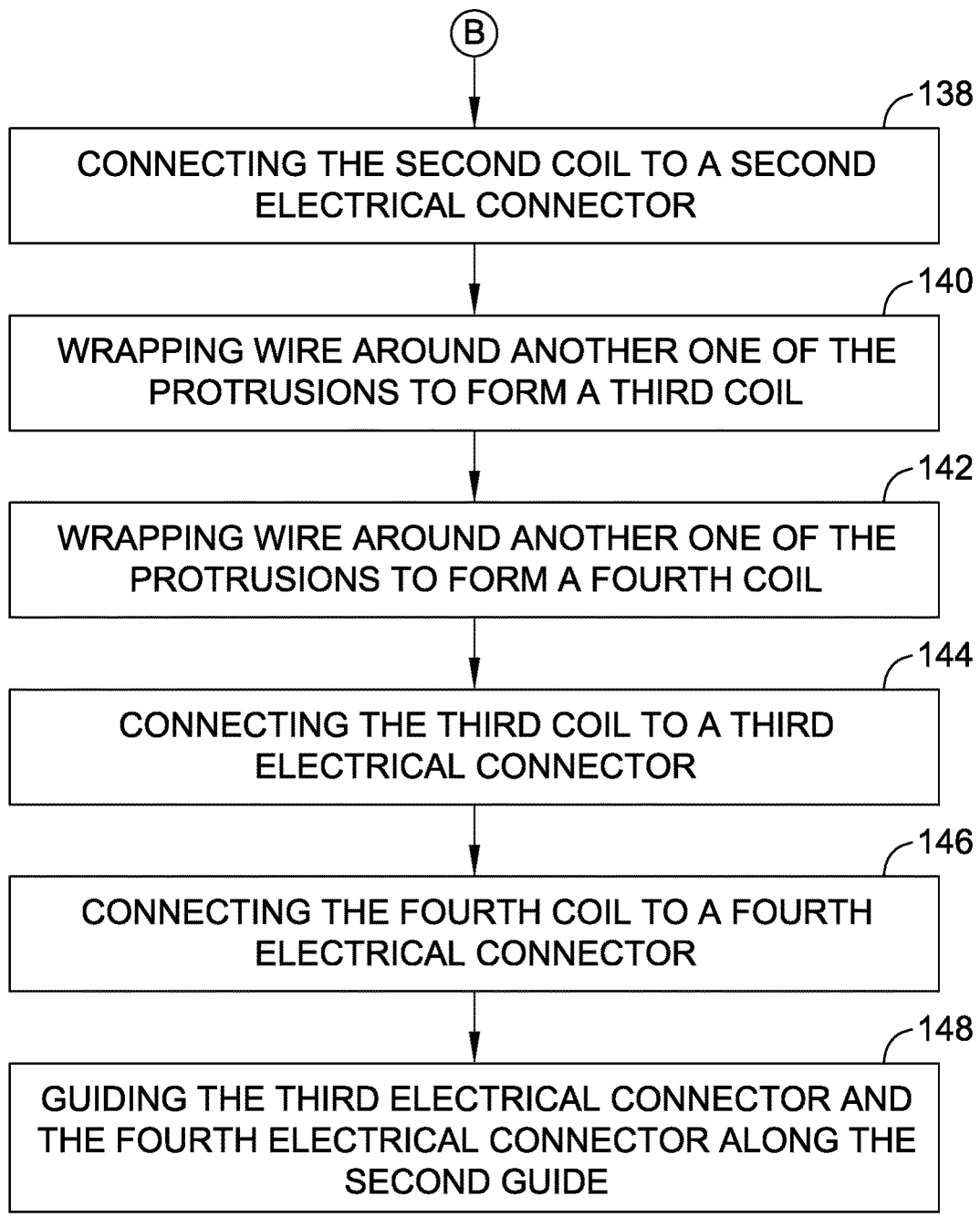
FIG. 7C is a third portion of a flow diagram of an exemplary method for providing interpole connections for a stator according to an aspect of the present invention

As shown in FIG. 6, it should be appreciated that the connectors 34 and 40 conduct electricity from the power source 48 to the coils 32. The connectors 34 and 40 may run directly from the power source 48 to a coil or from one coil 32 to another coil 32.

When building a motor, a motor builder or a winding machine advances continuous wire 33 around a tooth 26 to form a coil 32 and then forms a portion of the first connector 34 as the wire is advanced along the outside face of the guide. In this process the wire 33 passes along the outside face of the guide several times and, depending on the coils that are wired together, may both add a complex pattern of wire on the outside face of the guide that makes the thickness of the stator increase and makes the winding operation of the motor more difficult. Also, some the paths required for the wire may make abrupt turns that may be undesirable.

Typically, a winding machine includes a needle that has a wire holder in the form of for example an opening or hole. The needle enters the stator 20 from the central opening 21 of the stator 20 and guides the wire 33 around the teeth 26. For simplicity, wire conservation and winding efficiency the wire is guided along the outer face of the guide from the first tooth to have a coil wound about it to the next tooth to have a coil wound about it The arrangement of the connectors may vary widely depending on the type of motor. For example, the motor may be a capacitive start induction motor that has start windings that include a first plurality of coils that are connected to each other by the first connectors and a second plurality of coils that are connected to each other by the second connectors.

Figure 3:
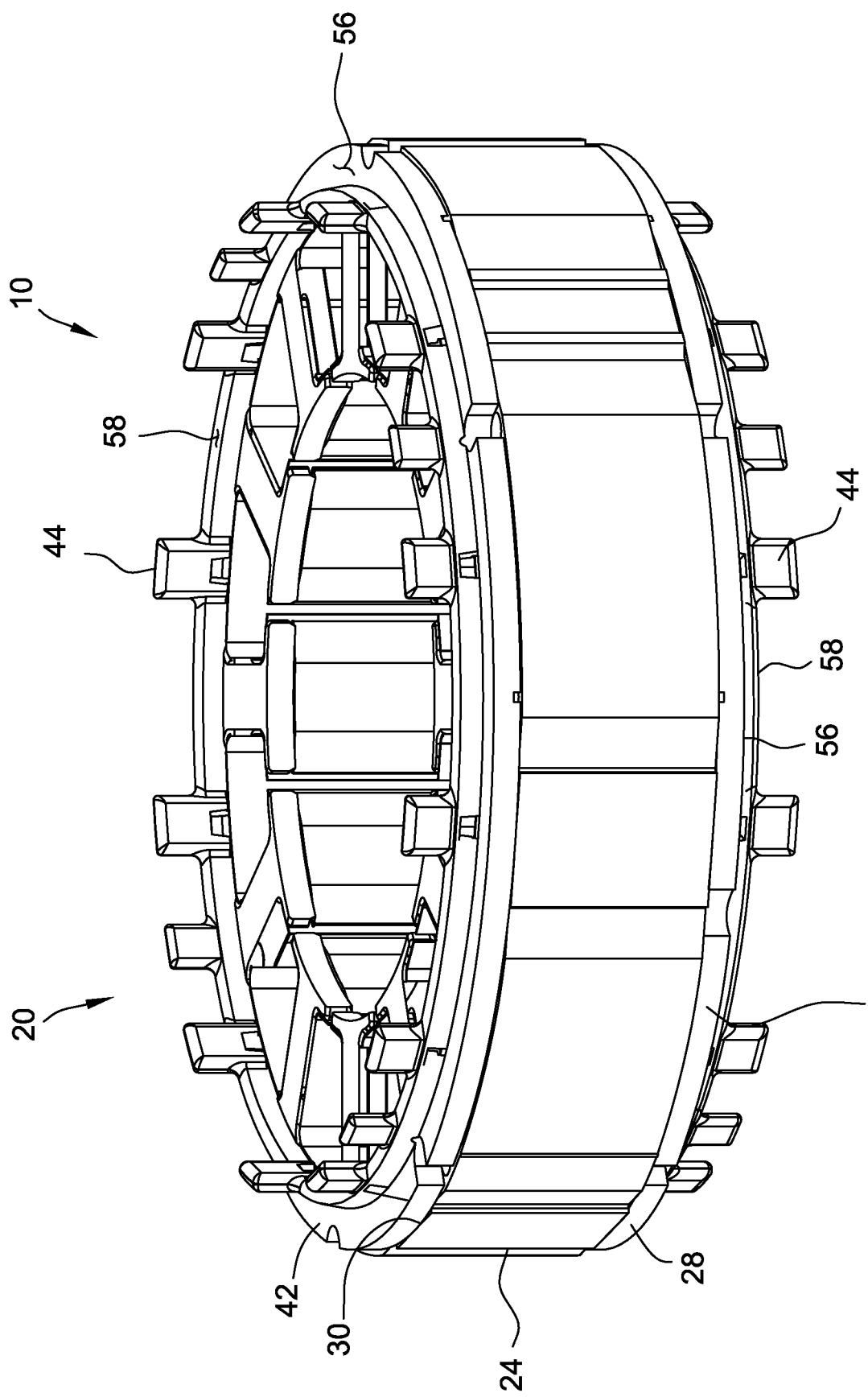
FIG. 3 is a perspective view of a stator for use in the motor of FIG. 1, with the coils and the interpole connections removed.

As shown in FIGS. 2-4, The first connectors may be positioned along the outside face of the first guide as the first plurality of coils are wound about the teeth. Similarly, the second connectors may be positioned along the second guide as the second plurality of coils are wound about the teeth. The tabs 44 serve to keep the connections in a proper position. By positioning the first connectors on the first guide and the second connectors on the second guide, the wiring of the motor may be simplified, resulting in shorter wire paths and reduced manufacturing and materials cost.

As shown, the motor, as stated above, may be an ECM motor with—3—three sets of windings, each set for a different one of three separate phases i.e. energized by each of the three phases: phase A, phase B and phase C. The problems mentioned above regarding capacitive start induction motors with start windings and run windings, particularly those related to connections and leads, are complicated by having a third set of winding in addition to the two sets of winding of an induction motor.

The ECM motor 10 of FIGS. 1-6 has the first plurality 31 of coils 32 or first set of coils that are connected to each other by the first connectors 34, a second plurality 38 of coils 34 or second set of coils that are connected to each other by the second connectors 40 and, as shown in FIGS. 3-6, a third plurality 50 of coils 32 or third set of coils that are connected to each other by third connectors 52.

As discussed earlier, to simplify wire winding paths and to minimize wire length, each of the three sets of windings should be formed by having the wire guided along the outer faces of only one guides of the stator from each tooth to have a coil wound about it to the next tooth to have a coil wound about it.

Since the ECM motor has three sets of winding, for simplicity and efficiency, two sets of windings should be formed by having the wire guided along the outer faces of the first guide of the stator and the third set of windings should be formed by having the wire guided along the outer faces of the second guide of the stator, or vice versa.

The first connectors may be positioned along the outside face of the first guide as the first plurality of coils are wound about the teeth. Similarly, the second connectors may be positioned along the second guide as the second plurality of coils are wound about the teeth. The tabs 44 serve to keep the connections in a proper position. By positioning the first connectors on the first guide and the second connectors on the second guide, the wiring of the motor may be simplified, resulting in shorter simpler wire paths and reduced manufacturing and materials cost.

Referring again to FIGS. 4 and 5, the first guide 36, the first plurality 31 of coils, the third plurality 50 of coils, the first electrical connectors 34 and the third electrical connectors 52 are shown in greater detail. It should be appreciated that the motor 10 may be configured such that the each spoke or tooth portion 47 of the first guide is aligned with one of the teeth 26 of the body 24 of the stator 20. As shown, the motor 10 may also be configured wherein the wires 33 of the coils 32 are wrapped around the tooth portions 47 of the first guide 36. The tooth portions 47 of the first guide 36 include an edge or corner 54 that protects the wire 33 as it is wound around the first guide 36 and the teeth 26.

As shown, the motor 10 may also be configured wherein the first guide 36 includes the axially extending tabs 44 for guiding the plurality of first electrical connectors 34 and for guiding the plurality of third electrical connectors 52.

As shown, the motor 10 may also be configured wherein the first guide 36 defines a circumferential recess 56 formed in outer face 58 of the outer ring 41 for guiding the plurality of first electrical connectors 34 and for guiding the plurality of third electrical connectors 52.

The recess 56 and the tabs 44 serve to separate the wires 33, particularly those of different phases, and to minimize current leakage between phases and to the stator body 26.

Referring now to FIGS. 2-6, the second guide 42, the second plurality 38 of coils, and the second electrical connectors 40 are shown in greater detail. It should be appreciated that the motor 10 may be configured such that the each spoke or tooth portion 47 of the first guide is aligned with one of the teeth 26 of the body 24 of the stator 20. As shown, the motor 10 may also be configured wherein the wires 33 of the coils 32 are wrapped around the tooth portions 47 of the second guide 42. The tooth portions 47 of the second guide 42 include an edge or corner 54 that protects the wire 33 as it is wound around the second guide 42 and the teeth 26.

As shown, the motor 10 may also be configured wherein the second guide 42 includes the axially extending tabs 44 for guiding the plurality of second electrical connectors 38.

As shown, the motor 10 may also be configured wherein the second guide 42 defines a circumferential recess 56 formed in outer face 58 of the outer ring 41 for guiding the plurality of second electrical connectors 38.

The recess 56 and the tabs 44, as well as placing second electrical connectors 40 for the second plurality 38 of coils on the second end face 30 of the stator 20, separated from the first electrical connectors 34 for the first plurality 31 of coils and the third electrical connectors 52 for the third plurality 50 of coils on the first end face 28 of the stator 20, serve to separate the wires 33, particularly those of different phases, and to minimize current leakage between phases and to the stator body 26.

Referring now to FIG. 8 and according to another aspect of the present invention, a method 100 for making an electrical machine is provided. The method 100 includes step 110 of providing a housing defining a cavity therein and having an external periphery of the housing. The method 100 also includes step 112 of providing a rotor defining an axis of rotation of the rotor and step 114 of disposing the rotor at least partially within the housing. The method also includes step 116 of configuring the rotor to rotate relative to the housing about the axis of rotation and step 118 of providing a stator with a first end face and an opposed second end face.

The method also includes step 120 of positioning the stator at least partially within the housing. The stator includes a body. The method also includes step 122 of connecting the body to the housing and step 124 of providing the body with a plurality of spaced apart inwardly extending protrusions. The method also includes step 126 of extending the protrusions in a direction parallel to the axis of rotation of the rotor from the first end face of the stator to the opposed second end face of the stator and step 128 of positioning a first guide at least partially over the first end face of the stator.

The method also includes step 130 of positioning a second guide at least partially over the second end face of the stator and step 132 of wrapping wire around one of the protrusions to form a first coil. The method also includes step 134 of wrapping wire around another one of the protrusions to form a second coil and step 136 of connecting the first coil to a first electrical connector. The method also includes step 138 of connecting the second coil to a second electrical connector and step 140 of wrapping wire around another one of the protrusions to form a third coil.

The method also includes step 142 of wrapping wire around another one of the protrusions to form a fourth coil, step 144 of connecting the third coil to a third electrical connector, step 146 of connecting the fourth coil to a fourth electrical connector, and step 148 of guiding the third electrical connector and the fourth electrical connector along the second guide.

In another aspect, the method may be provided wherein the electric machine includes a three phase electrically commutated motor. The method may further include the step of utilizing the first plurality of coils for a first of the three phases of the motor and further include the step of utilizing the second plurality of coils for one of a second and a third of the three phases of the motor.

The apparatus, methods, and systems described herein provide an electric motor and a stator assembly of the electric motor. The stator assembly is configured to provide an electric motor that may be used in additional applications to reduce inventory and simplify repair and replacement. For example, embodiments of the stator assembly include winding that provide a first or lower speed and a second or higher speed. In addition, in some embodiments, provide for wiring harnesses that simplify the installation of the motor. As a result, the motor may be used for multiple applications and reduce inventory and related costs.

Exemplary embodiments of an electric motor assembly are described above in detail. The electric motor assembly and its components are not limited to the specific embodiments described herein, but rather, components of the systems may be utilized independently and separately from other components described herein. For example, the components may also be used in combination with other machine systems, methods, and apparatuses, and are not limited to practice with only the systems and apparatus as described herein. Rather, the exemplary embodiments can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electric machine, the machine comprising:
    a housing, defining a cavity therein and having an external periphery thereof;
    a rotor defining an axis of rotation thereof and disposed at least partially within said housing and configured to rotate relative to said housing about the axis of rotation;
    a stator positioned at least partially within said housing, said stator comprising:
        a body connected to said housing, said body defining a plurality of spaced apart inwardly extending protrusions, the protrusions extending axially in a direction parallel to the axis of rotation of said rotor from a first end face of said stator to an opposed second end face of said stator;
        a first plurality of coils, each of the coils of the first plurality coils wrapped around one of the protrusions;
        a plurality of first electrical connectors, each of the coils of the first plurality coils connected to at least one of the plurality of first electrical connectors;
        a first guide positioned at least partially over the first end face of said stator, the first guide guiding each of the first electrical connectors;
        a second plurality of coils, each of the coils of the second plurality coils wrapped around one of the protrusions;
        a plurality of second electrical connectors, each of the coils of the second plurality coils connected to at least one of the plurality of second electrical connectors; and
        a second guide positioned at least partially over the second end face of said stator, the second guide guiding each of the second electrical connectors.

2. The electric machine in accordance with claim 1, wherein:
    the first guide defines a feature for receiving a portion of at least one of the plurality of first electrical connectors
    the first guide comprises a polymer.

3. The electric machine in accordance with claim 1:
    wherein said electric machine comprises a three phase electrically commutated motor;
    wherein the first plurality of coils is utilized for a first of the three phases of the motor; and
    wherein the second plurality of coils is utilized for one of a second and a third of the three phases of the motor.

4. The electric machine in accordance with claim 1, wherein the plurality of first electrical connectors comprise connector wires.

5. The electric machine in accordance with claim 4, wherein the first plurality of coils comprises coil wires.

6. The electric machine in accordance with claim 5, wherein at least one of the coil wires and at least one of the connector wires are fabricated of a continuous wire.

7. The electric machine in accordance with claim 1,
    wherein the protrusions comprise teeth;
    wherein at least one of the first guide and the second guide comprises tooth portions thereof, each tooth portion positioned adjacent one of the teeth; and
    wherein at least one of the first plurality of coils and second first plurality of coils wrapped around one of the tooth portions.

8. The electric machine in accordance with claim 1, wherein the first guide comprises axially extending tabs for guiding the plurality of first electrical connectors.

9. The electric machine in accordance with claim 1, wherein the first guide defines a circumferential recess for guiding the plurality of first electrical connectors.

10. A stator for use in an electric machine having a housing, and a rotor defining an axis of rotation thereof, said stator positioned at least partially within the housing, said stator comprising:
    a body connected to said housing, said body defining a plurality of spaced apart inwardly extending protrusions, the protrusions extending axially in a direction parallel to the axis of rotation of said rotor from a first end face of said stator to an opposed second end face of said stator;
    a first plurality of coils, each of the coils of the first plurality coils wrapped around one of the protrusions;

a plurality of first electrical connectors, each of the coils of the first plurality coils connected to at least one of the plurality of first electrical connectors;

a first guide positioned at least partially over the first end face of said stator, the first guide guiding each of the first electrical connectors;

a second plurality of coils, each of the coils of the second plurality coils wrapped around one of the protrusions;

a plurality of second electrical connectors, each of the coils of the second plurality coils connected to at least one of the plurality of second electrical connectors; and a second guide positioned at least partially over the second end face of said stator, the second guide guiding each of the second electrical connectors.

11. The stator in accordance with claim 10, wherein the first guide defines a feature for receiving a portion of at least one of the plurality of first electrical connectors.

12. The stator in accordance with claim 10:
wherein said electric machine comprises a three phase electrically commutated motor;
wherein the first plurality of coils is utilized for a first of the three phases of the motor; and
wherein the second plurality of coils is utilized for one of a second and a third of the three phases of the motor.

13. The stator in accordance with claim 10, wherein the plurality of first electrical connectors comprise connector wires.

14. The stator in accordance with claim 13, wherein the first plurality of coils comprises coil wires.

15. The stator in accordance with claim 14, wherein at least one of the coil wires and at least one of the connector wires are fabricated of a continuous wire.

16. The stator in accordance with claim 10:
wherein the protrusions comprise teeth;
wherein at least one of the first guide and the second guide comprises tooth portions thereof, each tooth portion positioned adjacent one of the teeth; and
wherein at least one of the first plurality of coils and second first plurality of coils wrapped around one of the tooth portions.

17. The stator in accordance with claim 10, wherein the first guide comprises axially extending tabs for guiding the plurality of first electrical connectors.

18. The stator in accordance with claim 10, wherein the first guide defines a circumferential recess for guiding the plurality of first electrical connectors.

19. A method for making an electrical machine, comprising the steps of:
providing a housing defining a cavity therein and having an external periphery thereof;
providing a rotor defining an axis of rotation thereof;
disposing the rotor at least partially within the housing;
configuring the rotor to rotate relative to the housing about the axis of rotation;
providing a stator with a first end face and an opposed second end face;
positioning the stator at least partially within the housing, said stator including a body;
connecting the body to the housing;
providing the body with a plurality of spaced apart inwardly extending protrusions;
extending the protrusions in a direction parallel to the axis of rotation of the rotor from the first end face of the stator to the opposed second end face of the stator;
positioning a first guide at least partially over the first end face of the stator;
positioning a second guide at least partially over the second end face of the stator;
wrapping wire around one of the protrusions to form a first coil;
wrapping wire around another one of the protrusions to form a second coil;
connecting the first coil to a first electrical connector;
connecting the second coil to a second electrical connector;
wrapping wire around another one of the of the protrusions to form a third coil;
wrapping wire around another one of the protrusions to form a fourth coil;
connecting the third coil to a third electrical connector;
connecting the fourth coil to a fourth electrical connector; and
guiding the third electrical connector and the fourth electrical connector along the second guide.

20. The method as in claim 19:
wherein said electric machine comprises a three phase electrically commutated motor;
further comprising utilizing the first plurality of coils for a first of the three phases of the motor; and
further comprising utilizing the second plurality of coils for one of a second and a third of the three phases of the motor.

* * * * *